United States Patent [19]

Petrich et al.

[11] Patent Number: 4,871,478

[45] Date of Patent: Oct. 3, 1989

[54] METHOD OF IMPROVING THE CRITICALITY SAFETY IN A LIQUID-LIQUID EXTRACTION PROCESS FOR SPENT NUCLEAR FUEL OR BREEDER REACTOR MATERIALS

[75] Inventors: Georg Petrich; Helmut Schmieder, both of Karlsruhe, Fed. Rep. of Germany

[73] Assignee: Kernforschungszentrum Karlsruhe GmbH, Karlsruhe, Fed. Rep. of Germany

[21] Appl. No.: 117,848

[22] Filed: Nov. 9, 1987

[30] Foreign Application Priority Data

Nov. 14, 1986 [DE] Fed. Rep. of Germany ....... 3639066

[51] Int. Cl.$^4$ ............... C21C 19/42; C01G 56/00; C01G 57/00; B01D 11/00
[52] U.S. Cl. ............................... 252/627; 252/626; 423/3; 423/8; 423/10; 423/250; 423/251
[58] Field of Search .................. 252/626, 627, 631; 423/8, 9, 10, 18, 2, 3, 250, 249, 251, 253

[56] References Cited

U.S. PATENT DOCUMENTS

| | | | |
|---|---|---|---|
| 3,949,049 | 4/1976 | Ochsenfeld et al. | 423/10 |
| 3,962,401 | 6/1976 | Tsuboya et al. | 423/10 |
| 4,080,273 | 3/1978 | DePoorter et al. | 423/10 |
| 4,481,135 | 11/1984 | Aspart et al. | 252/632 |
| 4,574,072 | 3/1986 | Horwitz et al. | 423/10 |
| 4,587,107 | 5/1986 | Wisniak | 423/10 |
| 4,749,518 | 6/1988 | Davis, Jr. et al. | 252/627 |
| 4,758,313 | 7/1988 | Schmieder et al. | 423/8 |
| 4,759,878 | 7/1988 | Henrich et al. | 252/627 |
| 4,764,352 | 8/1988 | Bathellier et al. | 423/10 |

FOREIGN PATENT DOCUMENTS 0070213 1/1983 European Pat. Off. .

OTHER PUBLICATIONS

W. Ochsenfeld et al., KFK-Report 911 pp. 15–16, 1970.
I, Kobayashi et al., Japan Atomic Energy Research Institute, Report JAERI-M 85-122, 1985.
H. Schmieder et al., KFK-Report 2940, p. 144, 1980.

Primary Examiner—Howard J. Locker
Attorney, Agent, or Firm—Spencer & Frank

[57] ABSTRACT

A process for the extraction of uranium and plutonium from spent nuclear fuels or breeder reactor materials. The spent nuclear fuels or breeder reactor materials are dissolved in nitric acid to provide an aqueous acid solution containing uranium, plutonium, neptunium, other transuranium elements, fission products, corrosion products, activation products and other contamination products. This aqueous acid solution is fed, as an aqueous phase, at a controllable flow rate into a liquid-liquid extraction apparatus also having an organic solvent phase flowing at a controllable rate. The organic phase contains an extraction agent. The temperature of solutions in the extraction apparatus and/or the concentration of the aqueous acid solution before the said aqueous acid solution is fed into the extraction apparatus, is adjusted to satisfy the following inequality:

$$T_E > 401 + (0.06676\ U_f - 0.3367\ Pu_f - 327.4\ H_f) \cdot$$
$$e^{0.00008179\ (U_f + Pu_f)\ H_f \cdot H_f - 0.9593}$$

where
- $T_E$ = the temperature of the solutions in the extractor (°C.);
- $U_f$ = the uranium concentration of the feed solution (g/l);
- $Pu_f$ = the plutonium concentration of the feed solution (g/l);
- $H_f$ = nitric acid concentration of the feed solution (M/l); and
- e = base of the natural logarithm system.

4 Claims, 13 Drawing Sheets

METHOD OF IMPROVING THE CRITICALITY SAFETY IN A LIQUID-LIQUID EXTRACTION PROCESS FOR SPENT NUCLEAR FUEL OR BREEDER REACTOR MATERIALS

BACKGROUND OF THE INVENTION

The present invention relates to a method of improving the criticality safety in a liquid-liquid extraction process for recycling spent nuclear fuel and/or breeder reactor materials, particularly those processes in which operating parameters vary from normal, or prescribed, limits.

One of the best known liquid-liquid extraction processes for recycling spent nuclear fuel and/or breeder reactor materials is the so-called PUREX process (e.g: R. I. Stevenson, P. E. Smith: Reactor Handbook (1961), Vol.II, p. 107: "Aqueous Separation") in which uranium and plutonium are separated from the accompanying fission, corrosion and activation products, neptunium, other transuranium elements and other contamination products by extraction from the nitric acid dissolver solution of the fuel or breeder reactor elements by means of the organic extraction agent tri-n-butyl phosphate (TBP), dissolved in an organic solvent or diluant. The separation is made possible by the differences in the distribution coefficients of the individual chemical species in TBP. The usual complexation strengths can be illustrated, for example, by the following sequence:

$$UO_2^{2+} > NpO_2^{2+} > Pu(IV) > Np(IV) \sim U(IV) >> Zr, Ru$$

(representative of all other fission products, etc.)

Multistage mixer settlers and centrifugal extractors as well as pulsed sieve plate columns are employed as countercurrent extraction apparatus. In the steps involving extraction of the valuable materials and washing away of unwanted fission products, for example in columns HA, HS and TS of FIG. 1, the separation of the poorly extractable fission products is supported by various measures:

1. Particularly for the better separation of Ru, washer HS is operated at a higher $HNO_3$ concentration (at about 4 mol $HNO_3/l$).

2. For the better separation of Zr, the washer marked TS is operated at a lower $HNO_3$ concentration than for the extraction (at about 1 mol $HNO_3/l$).

3. Generally, saturation of the extraction agent with the easily extractable $UO_2^{2+}$ and $PU(IV)$ ions at the highest possible level is desirable to keep the amount of free TBP, which is able to form complexes with fission products, as low as possible.

4. The nitric acid concentration in the aqueous feeder solution HAF before extraction of the values uranium and plutonium is set to about 3 mol/l because this concentration represents a compromise for the separation of Zr and Ru in the first extractor HA. With a high acid concentration, Zr is also extracted while Ru is extracted into the organic phase only at a lower acid concentration.

With the desired high saturation of the extraction agent, the traditional process is operated in a narrow range because even small changes in external parameters, such as, for example, those listed below, may cause losses of U and especially also of Pu into the aqueous waste solution HAW (see FIG. 2):

slow-down of extraction agent flow, HAX;
increase in the flow of feed solution, HAF;
an $HNO_3$ concentration in the feed solution, HAF, which is too low and not within recommended limits;
U and PU concentrations in the feed solution, HAF, which are not within recommended limits.

It is a particular drawback that, due to the lower complex formation, the more valuable and also more toxic Pu runs into the aqueous waste solution HAW. In the extreme case, this may raise criticality problems in the subsequent concentration and processing process of the aqueous waste solution. For that reason, the Pu content in the HAW must be monitored constantly and accurately in the industrial process by means of costly operational analyses. A complicated analysis vessel system installed in a critically safe configuration ensures that charges of too high a Pu concentration break through into the concentration evaporator. An automatic and reliable monitoring instrument system for this purpose has not yet become available.

Another problem touching on criticality safety relates to the peak-like accumulation of Pu occurring in all types of extraction apparatus during operation not outside normal parameters. In the extreme case, such accumulations may reach peak concentrations of several tens of grams of Pu per liter in the aqueous phase, as indicated by the corresponding curves in FIGS. 2 and 3 calculated for light water reactor and fast breeder reactor fuel components. Experimental tests regarding this problem (W. Ochsenfeld, H. Schmieder, S. Theiss, KfK-Bericht [KfK Report] 911, pages 15–16, 1970) have occupied those skilled in the art since about the early seventies. For example, just recently, complicated and expensive extraction test stands have been set up to examine this problem in the Federal Republic of Germany and also in other countries (I. Kobayashi et al, Japan Atomic Energy Research Institute, Report JAERI-M 85-152, 1985).

An additional problem occurring with Pu accumulations is the formation of a third, dense, organic phase in the extraction apparatus. This danger occurs, for example, with Pu concentrations of 25 g/l organic phase and higher. Depending on conditions, this corresponds to an aqueous Pu concentration of 10 or several 10 grams per liter, i.e. a concentration as may develop with the above-mentioned Pu accumulations in operation outside normal limits. The third heavy organic phase may contain Pu in concentrations of 50 g/l and more. Because the organic phase is denser than the aqueous phase, uncontrolled accumulations in the extraction apparatus must be expected and this must be considered in the context of criticality safety. Criticality safety within the extraction apparatus is ensured by geometric measures and/or, depending on the size of the apparatus, by the use of homogeneous or heterogeneous neutron absorbers (H. Schmieder et al, KfK-Bericht [KfK Report] 2940, page 144, 1980). In addition, safety instruments (neutron monitors) are often provided to permit detection of Pu accumulations as early as possible. It is obvious that these measures, together with the required efficiency checks, are complicated and expensive.

A further drawback of the traditional PUREX process is the unsatisfactory low separation of Np during the first extraction. Generally, only about 10% of the Np contained in the nuclear fuel is removed into the HAW. Thus, complicated measures for its separation become necessary in the purification cycles.

SUMMARY OF THE INVENTION

It is an object of the present invention to provide a quasi-inherent criticality safe process with which, particularly in the phases of extraction, fission product washing and during further processing of the aqueous, highly active waste stages, it is possible to reliably avoid undesirable plutonium accumulations and the formation of a dense organic, plutonium-containing phase.

This is accomplished in the present invention by controlling the temperature of the extraction solutions and/or by adjusting the concentrations of uranium, plutonium and nitric acid in the aqueous solution which comes from the dissolver (and which also may contain neptunium, other transuranium elements, fission products, activation products and other contamination products) before the aqueous acid solution is fed into the extraction apparatus, to satisfy the following inequality:

$$T_E > 401 + (0.06676\ U_f - 0.3367\ Pu_f - 327.4\ H_f) \cdot$$
$$e^{0.00008179\ (U_f + Pu_f)\ H_f \cdot Hf} - 0.9593$$

where $T_E$ = the temperature of the solutions in the extractor (°C.);

$U_f$ = the uranium concentration of the feed solution (g/l);

$Pu_f$ = the plutonium concentration of the feed solution (g/l);

$H_f$ = nitric acid concentration of the feed solution (M/l);

$e$ = base of the natural logarithm system.

The formula fixes the minimum conditions for solving the problem and gives the minimum relationships for the concentration parameters. The concentration parameters have a close relationship to the determination of the flow ratio. It is surprising that the percentage of TBP in the extraction agent phase does not enter into the operating states described by the formula. This means that the method according to the invention can be used not only in the standard 30% TBP process but also in similar reprocessing processes which employ TBP in other concentrations.

An advangageous feature of the process according to the invention is that a local degree of saturation for the extraction agent with uranium, Pu and HNO$_3$ can be achieved by manipulating the flow of the aqueous and the organic phases. The setting of the aqueous flow and/or the organic flow can be effected with the aid of concentration values detected at at least one point in the process sequence for at least uranium and/or plutonium and/or fission products and/or HNO$_3$ and/or values for the temperature and/or density and/or conductivity of the solution and/or the absorption of electromagnetic waves and/or capacitance and/or inductance compared to desired values.

The process has an explicitly error-friendly character, i.e., process conditions outside normal parameters caused by errors in operation also avoid the criticality risk and keep Pu losses low. Moreover, a significantly improved separation of the fission products and of Np can be expected during extraction if the extractor is operated in the high saturation range which the process according to the invention permits while the traditional PUREX process does not (or only to a limited degree).

Figure 4A:
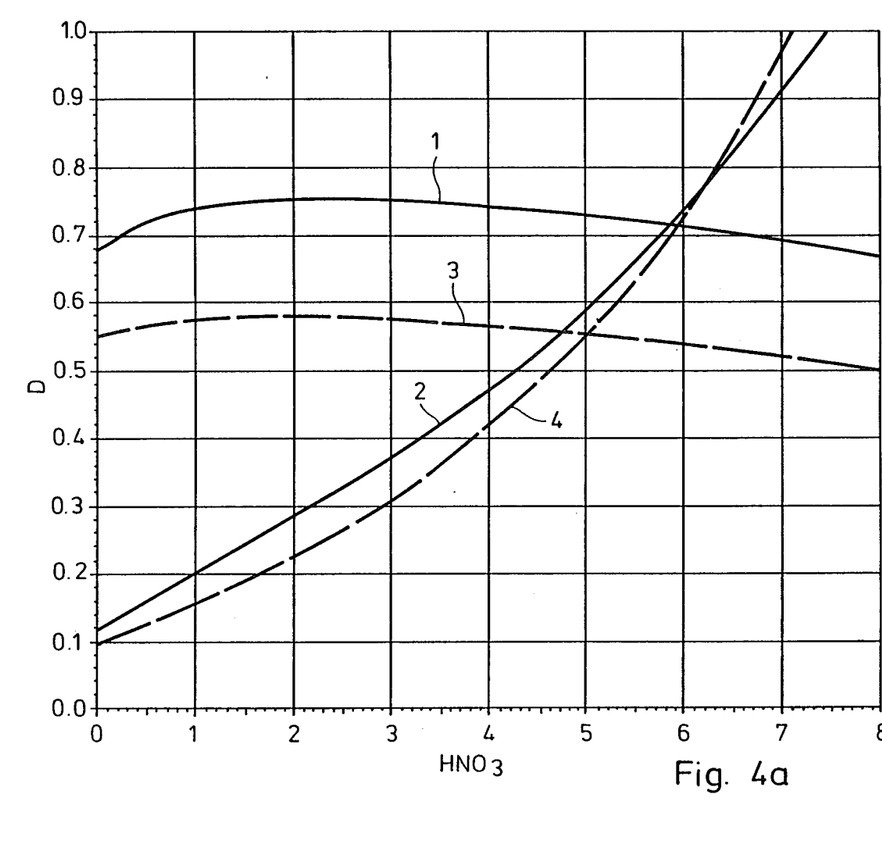
FIGS. 4a-4c show distribution coefficients for uranium and plutonium as functions of nitric acid molarity, temperature, and TBP concentration, respectively.
Figure 4B:
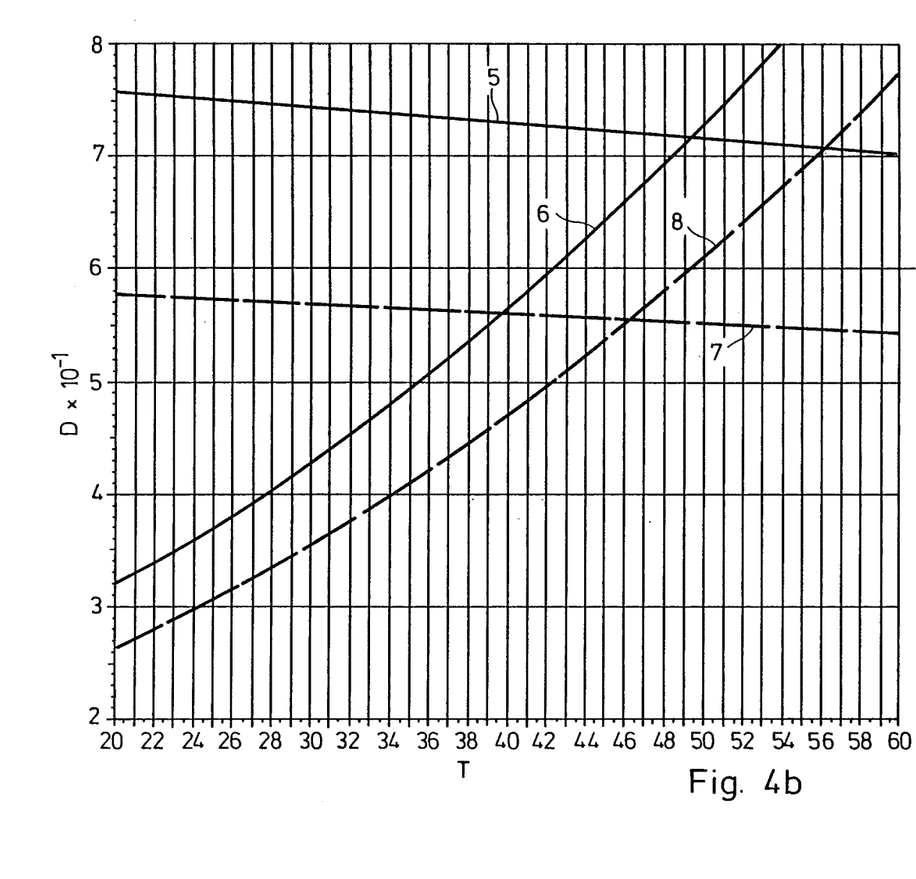
Figure 4C:
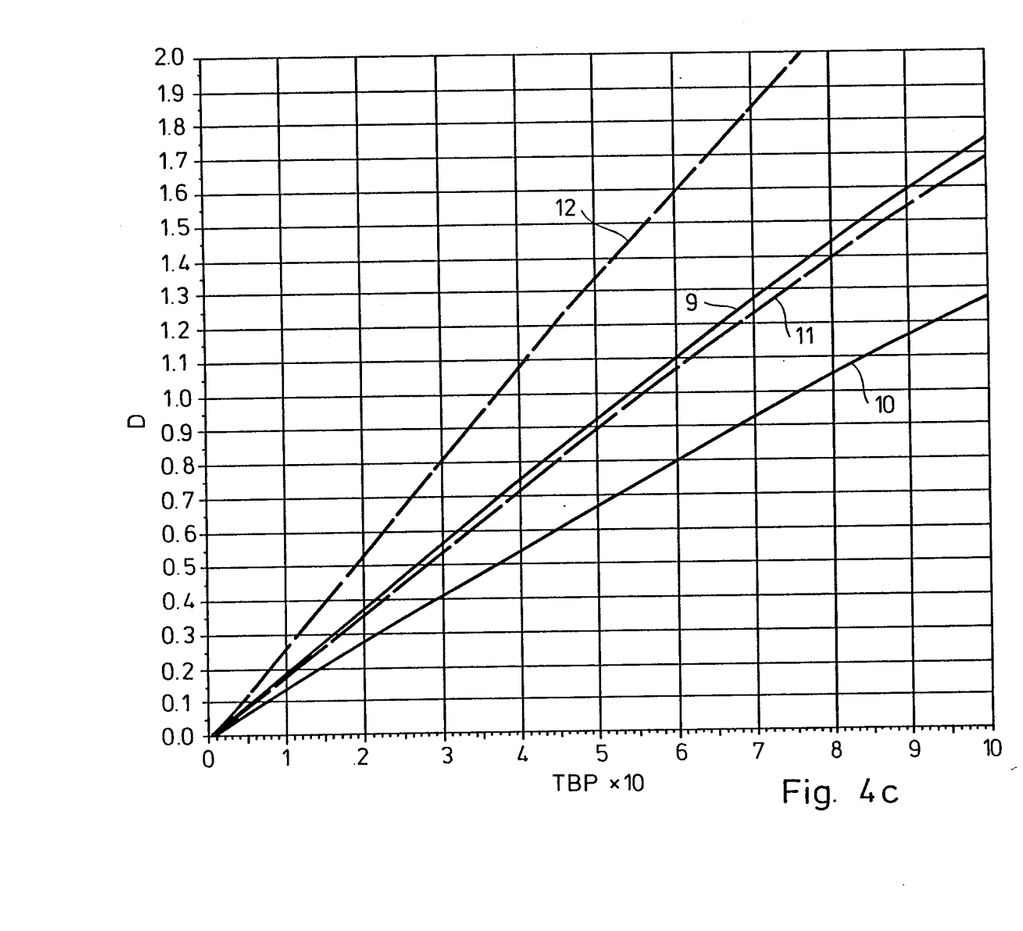

The basic idea of the invention is the selection of process conditions under which the abovementioned complex formation sequence no longer applies and Pu(IV) forms stronger complexes with TBP than $UO_2^{2+}$. Distribution measurement literature for the individual components, Pu(IV)-HNO$_3$/TBP and $UO_2^{2+}$-HNO$_3$/TBP, respectively, does not indicate such conditions. Even if the acid concentration is increased (from 0.5 to 6 M) and the temperature is varied (within a range from 20° to 40° C.), the distribution coefficient for $UO_2^{2+}$ always has a higher value than that of Pu(IV). Computer calculations based on thermodynamic considerations indicate that with HNO$_3$ concentrations above 5 M and/or at higher temperatures conditions exist under which plutonium is stronger in forming complexes with TBP than uranium (see FIG. 4). Extraction experiments performed in a countercurrent extractor indicate that at HNO$_3$ concentrations above 4 M and/or at elevated temperatures, Pu(IV) is indeed extracted better than $UO_2^{2+}$ so that, under such process conditions, Pu(IV) no longer leaves preferentially the extractor in the aqueous raffinite HAW, but instead $UO_2^{2+}$ does. Pu accumulations are also no longer observed.

Figure 5A:
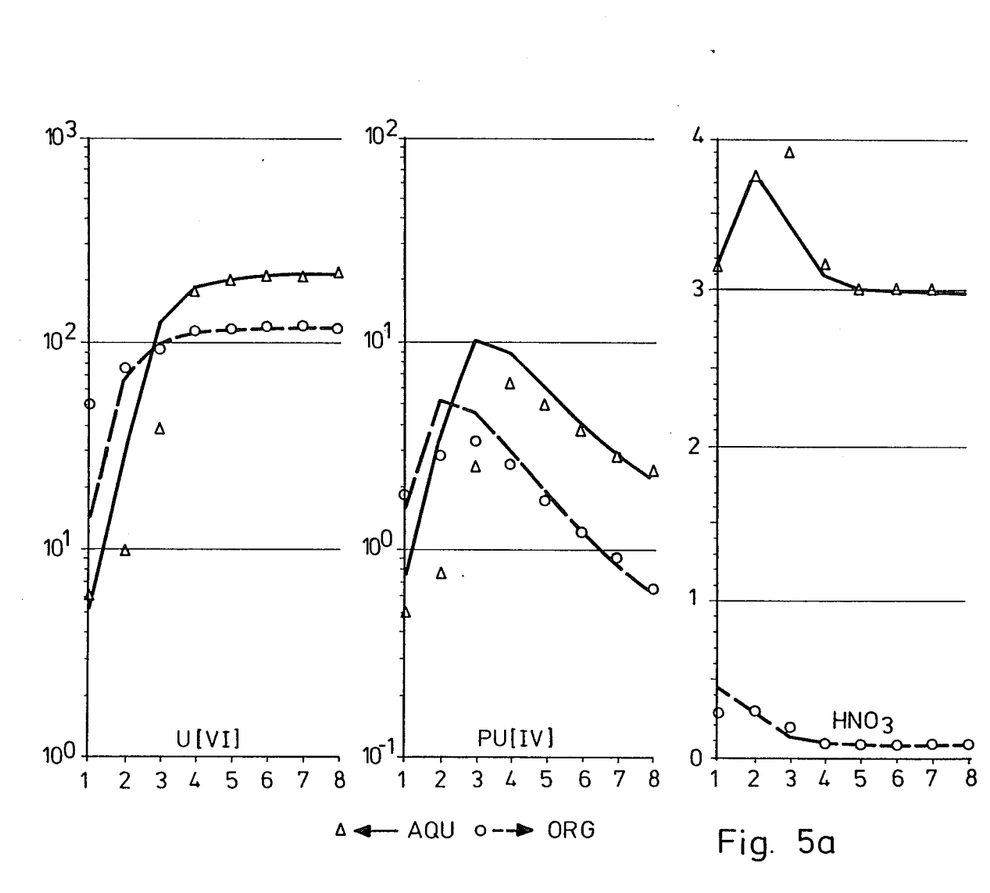
FIGS. 5a-5c also show concentrations of uranium, plutonium and nitric acid as a function of the extraction stage under various conditions, in an 8-stage mixer settler.
Figure 5B:
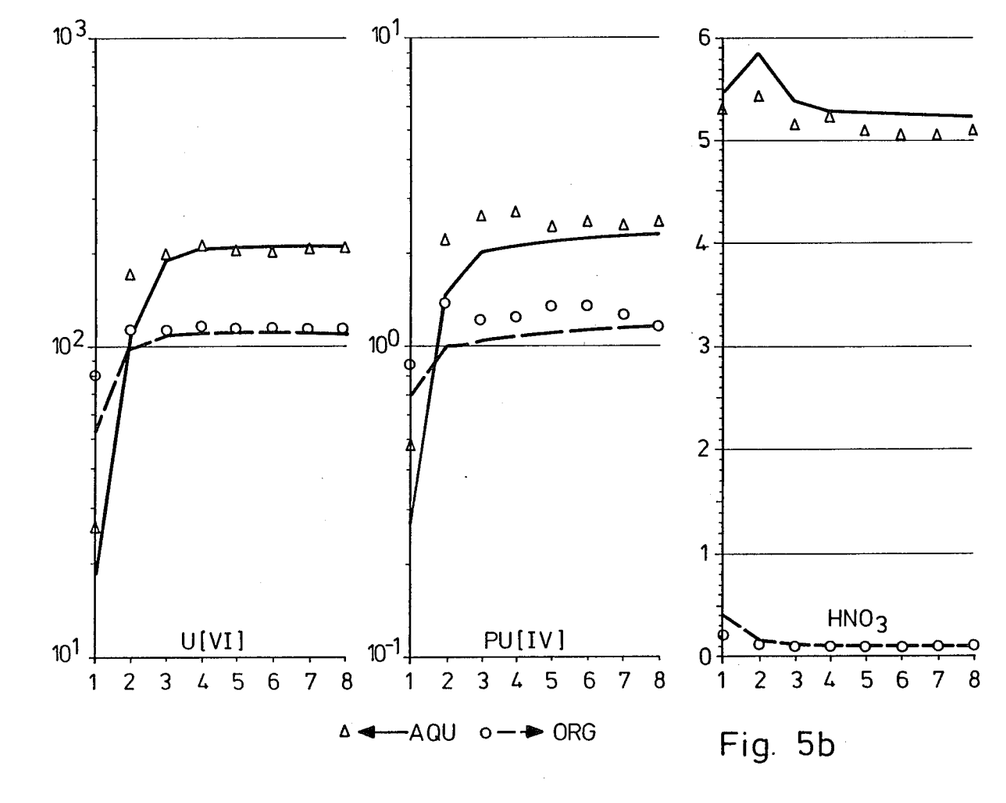
Figure 5C:
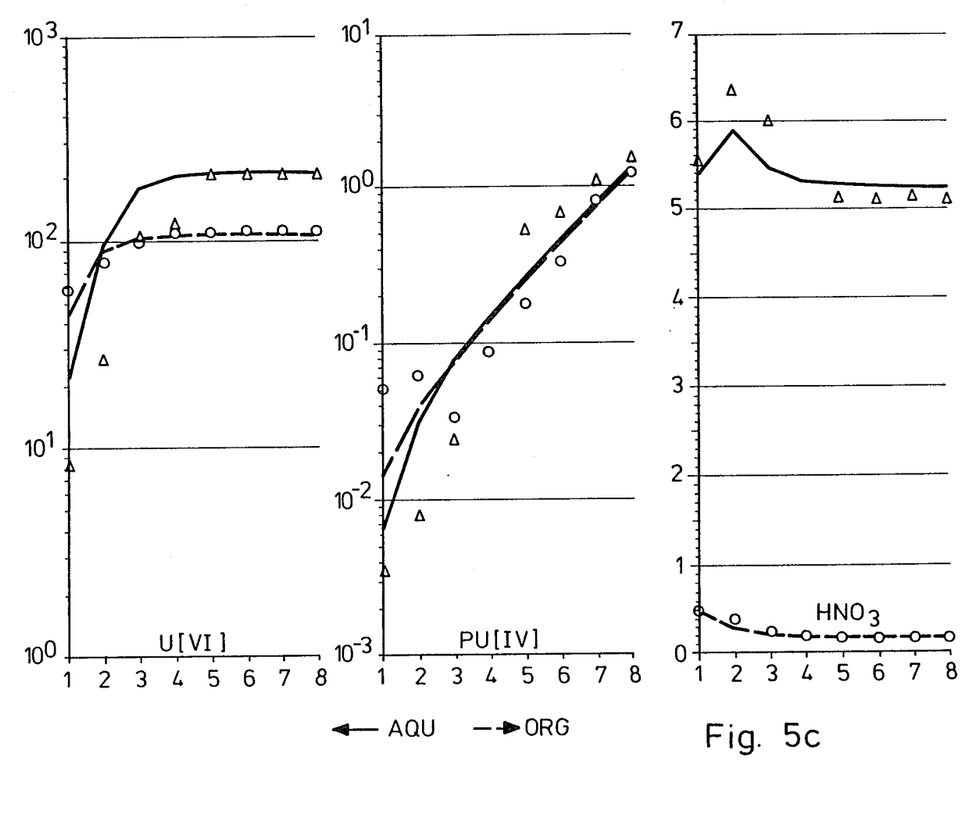
Figure 6A:
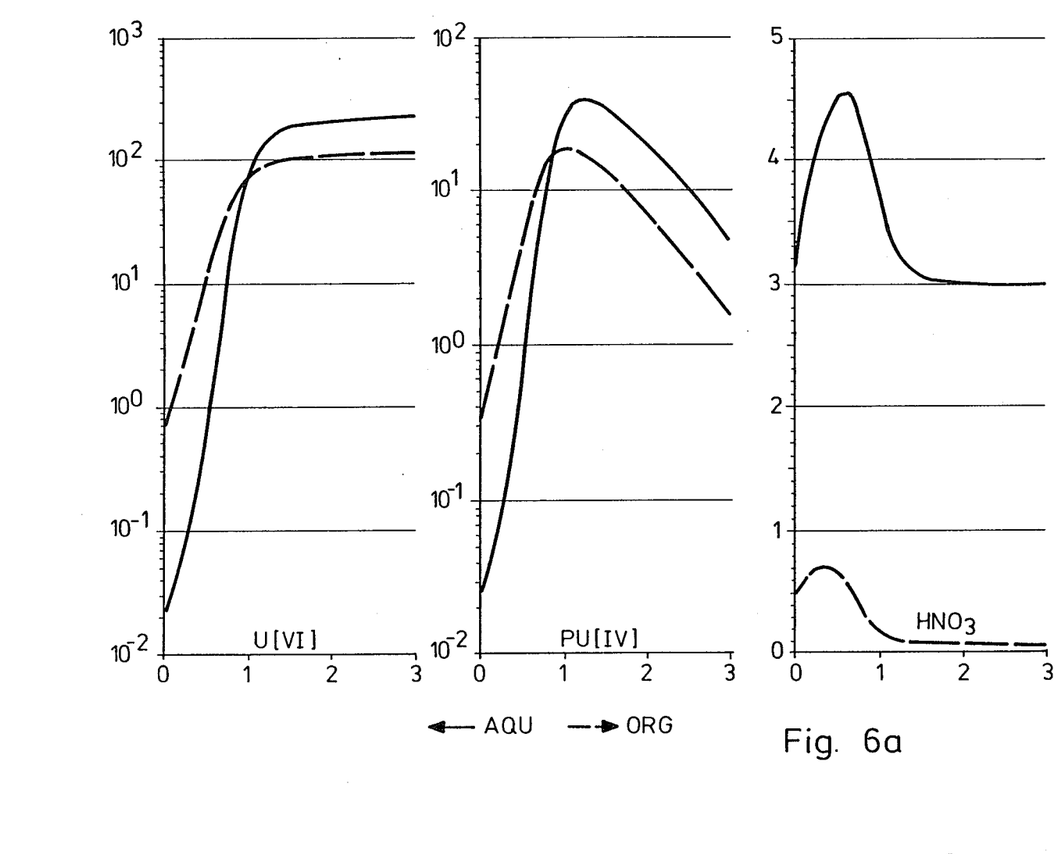
FIGS. 6a and 6b compare the prior art with the present invention using a pulse column and tracking the concentrations of uranium, plutonium and nitric acid.
Figure 6B:
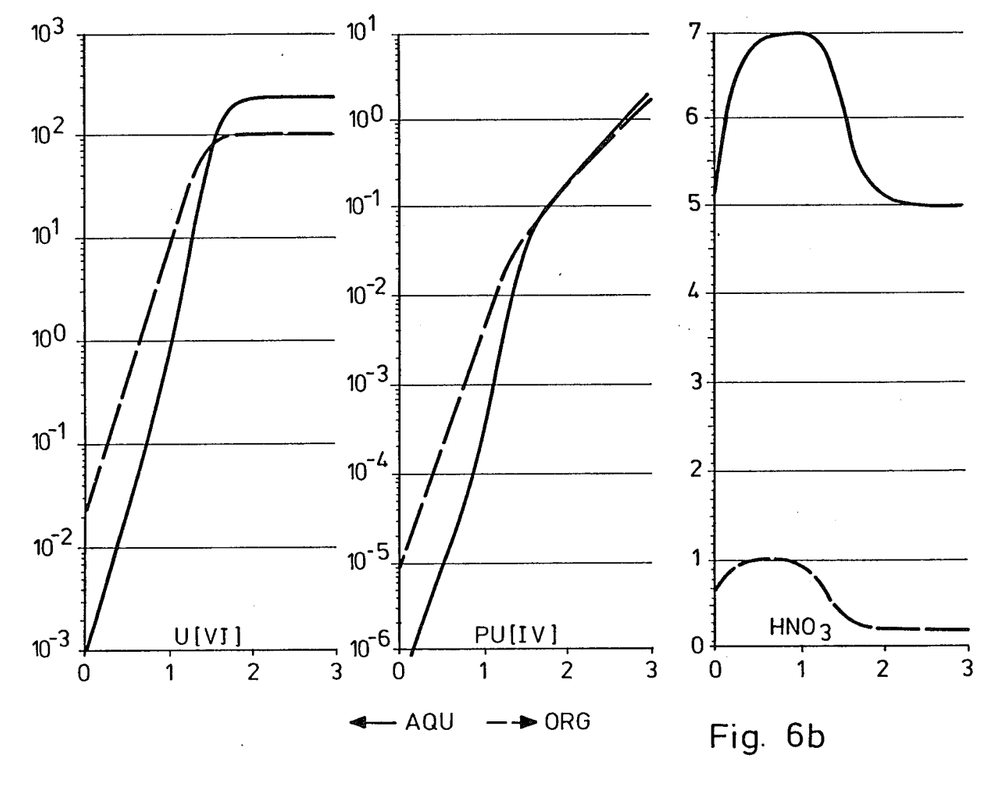
Figure 7A:
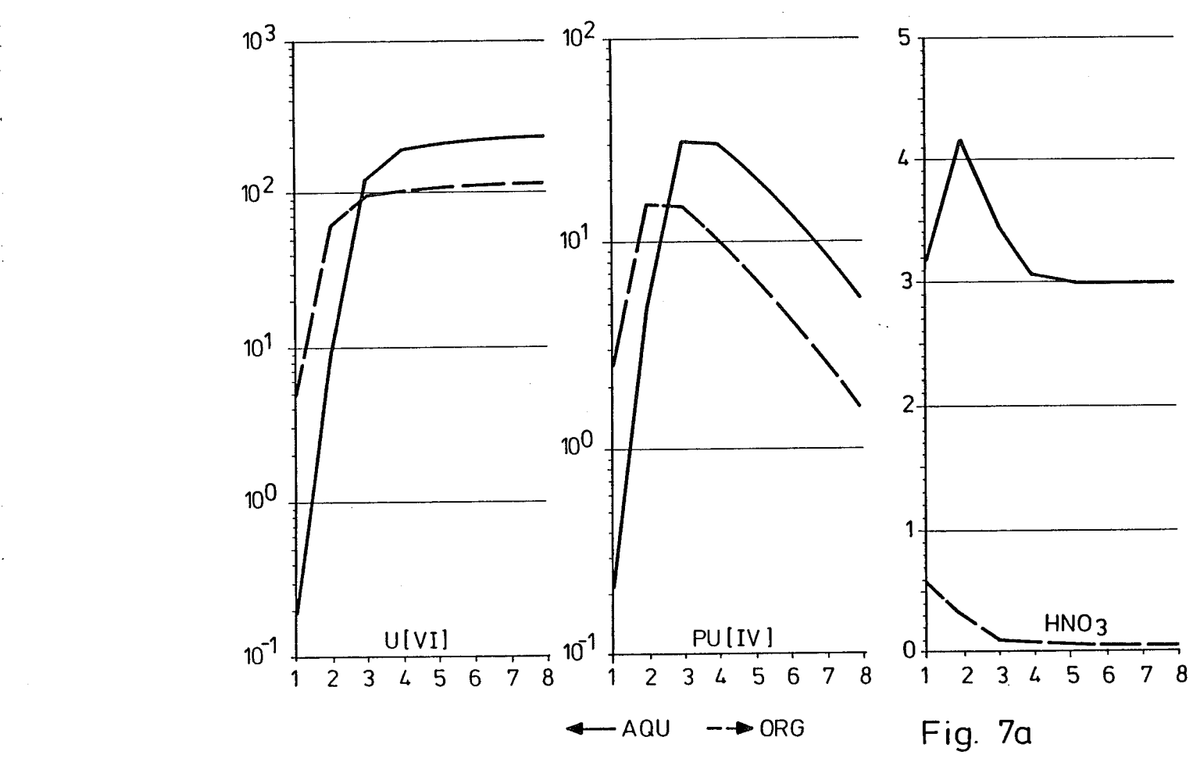
Figure 7B:
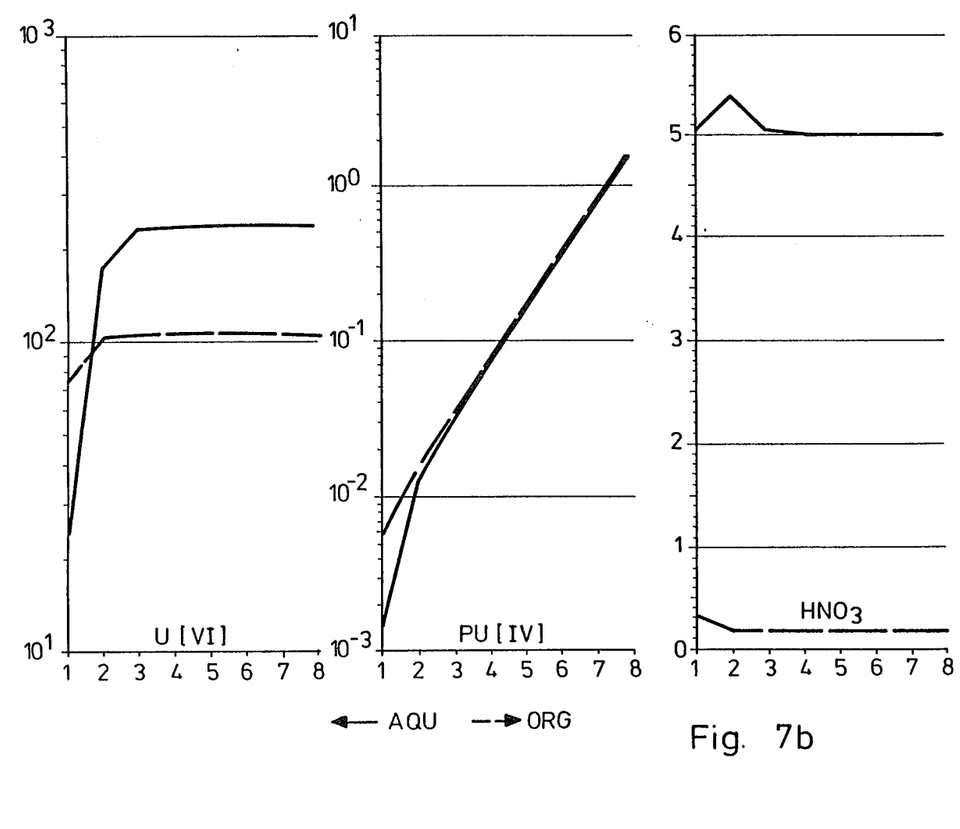

FIGS. 5 to 7 show calculated concentration profiles for the three extractor types customarily employed in the PUREX process and the concentration curves occurring in the traditional process under process conditions outside normal operating parameters with preferred Pu extraction in the HAW and Pu accumulations. However, these graphs also indicate that in the process according to the invention, the extraction edge of uranium extends far ahead of the edge of plutonium which proves the poorer extractability of uranium. This fact now permits better utilization of the extractor in that a considerable number of stages of a mixer settler battery or of a centrifugal extractor battery or a considerable length of a pulsating perforated bottom column can be operated with high uranium saturation in the extraction agent which enhances the separation of fission products, particularly the separation of Ru and also Np. The increased temperature also contributes to this improvement. As shown by preliminary experiments and model computations, a decontamination factor between 10 and 100 is realized for Ru and an improvement in separation by a factor of 4 is realized for Np under these conditions. The avoidance of uranium losses in the RAW can be ensured by simply detecting the extraction edge over temperature measuring locations (positive thermal coloration during complex formation) or density measuring locations along the extractor. Significant Pu losses need not be feared under any circumstances since in the process according to the invention such Pu losses occur only if there is a massive breakthrough of U in the HAW. In this way—by improved fission product separation during extraction—it is possible to ultimately eliminate one fission product washer so that only a single fission product washer is needed after the extraction and this washer is preferably operated at a lower HNO$_3$ concentration to wash Zr and tritium out of the extraction agent.

In the traditional process, the flow ratio (organic phase flow)/(aqueous phase flow) is set in such a manner that, with given concentrations of the feed solutions, saturation of TBP is by far not reached at all points in the extractor (e.g. it remains 10% to 30% below saturation). Only if the flow ratio is reduced to a value which reaches or exceeds TBP saturation, will losses of U and Pu occur as well as a Pu peak (=Pu accumulations in the concentration profile beyond the extraction stages).

The present invention prevents the formation of a Pu peak under all flow conditions and reduces the Pu percentage in the raffinite under all flow conditions.

A further specific advantage of the process according to the invention is the possibility of improving separation of the fission products, Np and other contamination products. This is done by lowering the uranium and plutonium concentrations in the feed solution considerably below the customary values of the traditional process so that the flow ratio (calculated from the desired saturation) is reduced. This then considerably reduces the extraction factors (=distribution coefficient times flow ratio) which are determinative for the separation of the fission products and Np, etc.; in particular, a noticeable improvement in separation is realized with high saturation. In the process according to the invention there is available, in addition to the "saturation" parameter, also a "flow ratio" parameter to improve separation.

A minimum combination of process conditions in a multiparameter system according to the present invention which can be successfully reduced to practice is given by the following typical values:

Charge the aqueous phase (feed solution HAF) with $U_f=275$ g/l; $Pu_f=3$ g/l; $H_f=3$ M/l at a temperature in the extraction apparatus of $>41.2°$ C.

For reasons of corrosion and other characteristics of the solutions, the temperature in the apparatus and in the solutions should not exceed 80° C.

BRIEF DESCRIPTION OF THE DRAWINGS

FIGS. 7a and 7b compare the same conditions as FIGS. 6a and 6b but using a centrifugal extractor.

DESCRIPTION OF THE PREFERRED EMBODIMENTS

The invention will be described in greater detail below with the aid of several examples and in conjunction with the drawing figures.

Figure 1:
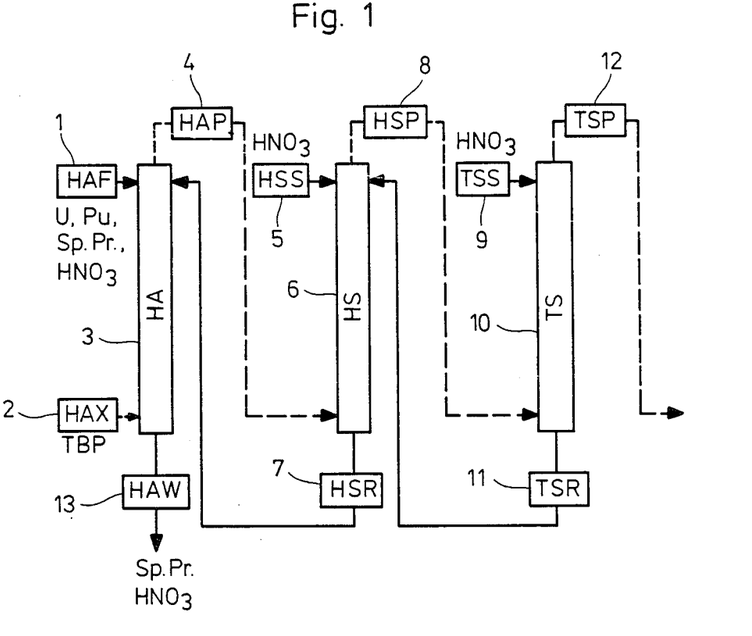
FIG. 1 is a schematic drawing of a liquid-liquid countercurrent extraction apparatus consisting of several stages.

FIG. 1 shows the basic flow diagram of the conventional first cycle Purex U/Pu coextraction and scrubbing extractors:

1: HAF=high active feed solution carrying U Pu and fission products (denoted Sp.Pr.);
2: HAX=extraction agent feed;
3: HA =extractor for U/Pu coextraction;
4: HAP=U/Pu product solution leaving the HA extractor;
5: HSS=nitric acid scrub solution;
6: HS =scrubbing extractor particularly for the better separation of Ru;
7: HSR=aqueous phase reflux from HS to HA;
8: HSP=U/Pu product solution leaving the HS extractor;
9: TSS=nitric acid scrub solution;
10: TS =scrubbing extractor particularly for the better separation of Zr;
11: TSR=aqueous phase reflux from TS to HS;
12: TSP=U/Pu product solution leaving the TS extractor;
13: HAW=high active waste solution.

EXAMPLE 1

The plutonium behavior during extraction under process conditions not according to prescribed procedures as a function of changes in the parameter field.

Figure 2:
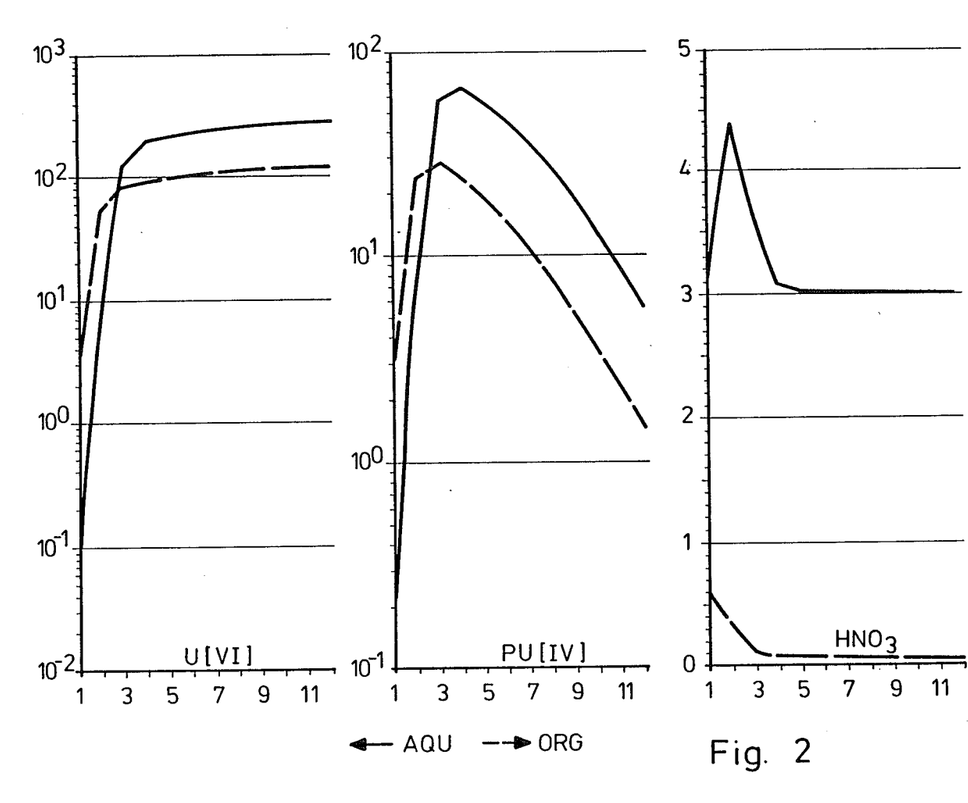
FIGS. 2 and 3 shows concentrations of uranium, plutonium and nitric acid in organic and aqueous phases in the extraction apparatus as a function of the stage in a 12-stage mixer settler.

A. PUREX process performed according to process conditions customary in the past:

(a) If, during extraction of uranium and plutonium from light water reactor (LWR) fuel containing 1 weight % Pu in a 12-stage mixer settler at a temperature of 25° C., the ratio of the flow of the organic phase HAX (=TBP solution) to the flow of the aqueous phase HAF (=containing the feed solution, values, fission products, etc.) is changed intentionally or unintentionally, for example due to the reduction of HAX flow, an extraction curve results as indicated by the curves of the concentration profiles for uranium, plutonium and $HNO_3$ of FIG. 2. The aqueous feed solution HAF, which is 3 molar $HNO_3$, is fed into the twelfth stage and leaves the mixer settler from the first stage. The organic solution HAX is introduced in the opposite direction into the first stage and is extracted again from the twelfth stage. As indicated by the calculated curves, plutonium accumulates under conditions not according to prescribed procedures in the aqueous phase as well as the organic phase, with the maximum plutonium concentrations in the aqueous phase existing in stages 3 and 4 and in the organic phase in stages 2 and 3. For safety reasons, an accumulation of plutonium, hereinafter called the Pu peak, must be avoided.

Figure 3:
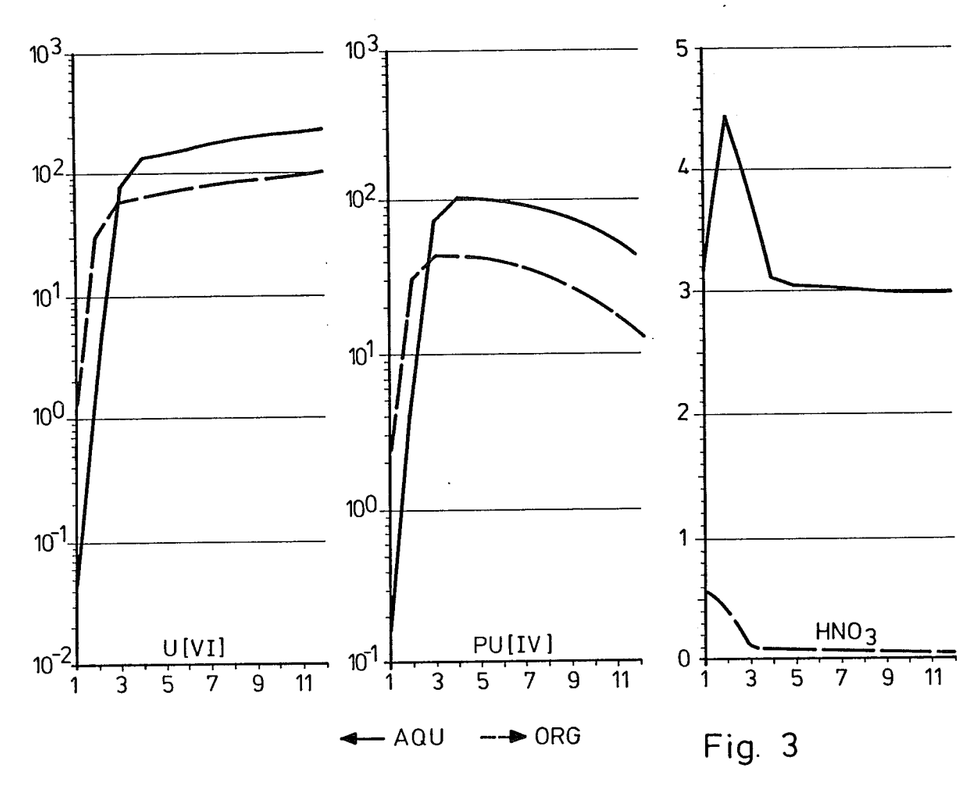

(b) In an analogous manner, the concentration profiles for U, Pu and $HNO_3$ were calculated in the course of the extraction of fast breeder fuel containing 11 weight % Pu under otherwise identical conditions. Here again a reduction of HAX in a 12-stage mixer settler at 25° C. and with an $HNO_3$ molarity of 3 in the feed solution results in an accumulation of Pu(IV) in the organic as well as in the aqueous phase (FIG. 3).

B. The Pu peak in the Pu(IV) concentration profiles occur if, with the organic phase highly saturated, the distribution coefficient $D_U$ is greater than the distribution coefficient $D_{Pu}$. In FIG. 4a, the (calculated) distribution coefficients are plotted for uranium and plutonium as a function of the aqueous nitric acid concentration. The Pu concentration of the aqueous phase was kept constant at 1 g/l, the temperature at 25° C. and the TBP concentration in the organic phase at 30 volume %. In the first case, the uranium concentration in the aqueous phase was 150 g/l (curves 1 and 2) and in the second case 200 g/l (curves 3 and 4).

Curve 1: $D_U$

Curve 2: $D_{Pu}$
Curve 3: $D_U$
Curve 4: $D_{Pu}$

Up to an HNO$_3$ concentration of about 5 mol/l, the values for $D_U$ are greater in both cases than the values for $D_{Pu}$. For an uranium concentration of 150 g/l in the aqueous phase, $D_{Pu}$ becomes greater than $D_U$ at 5.8 mol/l HNO$_3$. For an uranium concentration of 200 g/l in the aqueous phase, $D_{Pu}$ becomes greater than $D_U$ at 5.1 mol/l HNO$_3$. This means that under the stated process conditions, the Pu peaks disappear in the first case at 5.8 mol/l HNO$_3$ and in the other case at 5.1 mol/l HNO$_3$.

In FIG. 4b, the (calculated) distribution coefficients of uranium and plutonium are plotted as a function of temperature. In this case, the Pu concentration of 1 g/l in the aqueous phase, the HNO$_3$ concentration of 3 mol/l in the aqueous phase and the TBP concentration in the organic phase at 30 volume % were kept constant. The uranium concentrations in the aqueous phase were the same as for FIG. 4a.

Curve 5: $D_U$ for 150 g U/l
Curve 6: $D_{Pu}$ for 150 g U/l
Curve 7: $D_U$ for 200 g U/l
Curve 8: $D_{Pu}$ for 200 g U/l As indicated by the curves, with an uranium concentration of 150 g/l, $D_{Pu}$ becomes greater than $D_U$ at 49° C. and at a uranium concentration of 200 g/l, $D_{Pu}$ becomes greater than $D_U$ at 47° C.

FIG. 4c shows the (calculated) distribution coefficients of uranium and plutonium as a function of the TBP concentration.

The Pu concentration of 1 g/l in the aqueous phase, the U concentration of 200 g/l in the aqueous phase and the HNO$_3$ concentration of 4 mol/l in the aqueous phase were kept constant. The temperature was set at 25° C. in one case and at 50° C. in the other case.

Curve 9: $D_U$ at 25° C.
Curve 10: $D_{Pu}$ at 25° C.
Curve 11: $D_U$ at 50° C.
Curve 12: $D_{Pu}$ at 50° C.

At 25° C., $D_{Pu}$ is less than $D_U$ for all TBP concentrations and at 50° C. it is greater than $D_U$ (again for all TBP concentrations). The limit temperature at which $D_U$ becomes equal to $D_{Pu}$ is 35.1° C.

EXAMPLE 2

Comparison of the calculated concentration profiles with concentration values for U, Pu and HNO$_3$ obtained experimentally in an 8-stage mixer settler during the extraction process.

The comparison was made in the course of the traditional PUREX process in the operating state not following prescribed procedures (FIG. 5a) according to the process of the invention within one of the limit ranges in which the curve of the plutonium concentration includes flat sections (FIG. 5b) and according to the process of the invention with an additionally increased temperature (50° C.; FIG. 5c).

The solid curves correspond to the calculated concentration profiles of uranium, plutonium and HNO$_3$ in the aqueous phase and the dashed curves correspond to the concentration profiles of U, Pu and HNO$_3$ in the organic phase. The concentration values measured in the aqueous phase are identified by triangles, the concentration values measured in the organic phase are identified by small circles. It is evident that the measured values show great coincidence with the curves.

The remaining differences originate from the fact that the volume flow for this extremely sensitive process could not be kept sufficiently constant in the experiments.

Process conditions

FIG. 5a: Prior art process (operation not according to prescribed procedures)

Aqueous feed solution 150 ml/h, 3 molar HNO$_3$, 211 g U/l, 2.03 g Pu/l;
Organic phase 260 ml/h; 20° C.

FIG. 5b: Process according to the invention:
Aqueous phase 150 ml/h, 5.2 molar HNO$_3$, 211 g U/l, 2.35 g Pu/l;
Organic phase 258 ml/h; 20° C.

FIG. 5c: Process according to the invention;
Aqueous phase 150 ml/h, 5.2 molar HNO$_3$, 211 g U/l, 2.35 g Pu/l;
Organic phase 258 ml/hg; 50° C.

Comments to FIG. 5a

The aqueous waste solution leaving stage 1 of the mixer settler causes uranium losses of 6 g/l and Pu losses of 0.5 g/l. The maximum measured Pu accumulation is 6.5 g/l and, the maximum calculated Pu accumulation is 10 g/l. In order to be able to avoid the Pu peak under the process conditions of FIG. 5a, the temperature would have to be at least 45.7° C.

Comments to FIG. 5b

With uranium losses of 26 g/l in the aqueous waste solution leaving the mixer settler, the Pu losses are here 0.5 g/l. This flow scheme represents precisely the borderline between Pu accumulation and non-accumulation. The precise limit temperature, calculated for the conditions existing in FIG. 5b, is 20.4° C.

Comments to FIG. 5c

Although in the present case the uranium losses in the aqueous waste solution were measured at 8 g/l, the Pu losses were only a few mg/l. A Pu accumulation cannot be noted; the limit temperature for the present process conditions is the same as stated for FIG. 5b.

EXAMPLE 3

Comparison of the prior art process with operation under conditions not according to prescribed procedures (FIG. 6a) and of the process according to the invention (FIG. 6b) in a pulse column.

The concentration profiles of uranium, plutonium and HNO$_3$ on which this comparison is based were calculated for each case.

Process conditions

FIG. 6a
Aqueous phase 2.3 l/h, 234 g U/l, 3.4 g Pu/l, 3 molar HNO$_3$;
Organic phase 5 l/h; 25° C.

FIG. 6b
Aqueous phase 2.3 l/h, 234 g U/l, 3.4 g Pu/l, 5 molar HNO$_3$;
Organic phase 5 l/h; 50° C.

In FIG. 6a, a clearly discernible Pu peak can be noted in the aqueous phase as well as in the organic phase. The maximum Pu accumulation in the aqueous phase was about 43 g/l. In contrast thereto, no Pu accumulation occurred in FIG. 6b. The Pu losses were noticeably less than the U losses.

In order to be able to avoid the Pu peak under the process conditions of FIG. 6a, the temperature would have to be raised to at least 43.7° C.

The limit temperature for the process conditions according to FIG. 6b was 19.6° C.

EXAMPLE 4

Comparison of the prior art process under conditions not according to prescribed procedures (FIG. 7a) with the process according to the invention (FIG. 7b), each time in a centrifugal extractor (according to calculated concentration profiles).

Process conditions were the same as in Example 3, i.e. the process conditions of FIG. 7a correspond to those of FIG. 6a and the process conditions of FIG. 7b correspond to those of FIG. 6b.

As can be seen in FIG. 7a, the maximum Pu accumulation in the aqueous phase was about 32 g/l. In FIG. 7b, no Pu accumulation occurred. The Pu losses were noticeably smaller than the U loses. To be able to avoid a Pu peak in FIG. 7a, the temperature would have to be raised to at least 43.7° C. The limit temperature for the conditions of FIG. 7b was 19.6° C.

It will be understood that the above description of the present invention is susceptible to various modifications, changes and adaptations, and the same are intended to be comprehended within the meaning and range of equivalents of the appended claims.

We claim:

1. In a process for the extraction of uranium ad plutonium from spent nuclear fuels or breeder reactor materials comprising dissolving the spent nuclear fuels or breeder reactor materials in nitric acid to provide an aqueous acid solution comprising uranium, plutonium and at least one of neptunium, other transuranium, elements, fission products, corrosion products, activation products and other contamination products, and feeding the aqueous acid solution as an aqueous phase at a controlled flow rate into a liquid-liquid extraction apparatus where said aqueous phase is brought into contact with an organic solvent phase which is fed into said extraction apparatus at a controlled flow rate, said organic phase comprising an extraction agent, the improvement of adjusting at least one of the temperature of solutions in the extraction apparatus and the concentration of the aqueous acid solution before feeding said aqueous acid solution into the extraction apparatus, to satisfy the following inequality:

$$T_E > 401 + (0.06676\ U_f - 0.3367\ Pu_f - 327.4\ H_f) \cdot$$

$$e^{0.00008179\ (U_f + Pu_f)\ H_f H_f} - 0.9593$$

where
$T_E$ = the temperature of the solutions in the extraction apparatus (°C.);
$U_f$ = the uranium concentration of the feed solution (g/l);
$Pu_f$ = the plutonium concentration of the feed solution (g/l);
$H_f$ = nitric acid concentration of the feed solution (M/l); and
e = base of the natural logarithm system.

2. A process as defined in claim 1, comprising the additional step of controlling the flow of at least one of the aqueous and organic solvent phases to ensure that the extraction agent is saturated with uranium, plutonium and nitric acid in at least one point in the extraction apparatus.

3. A process as defined in claim 1, comprising the additional steps of monitoring the concentration of at least one of uranium, plutonium, fission products and nitric acid in at least one point in the extraction apparatus and comprising the concentration with a given value calculated from the inequality in claim 1 to aid in controlling the flow rate of at least one of the aqueous and organic phases.

4. A process as defined in claim 1, comprising the additional step of monitoring at least one of the temperature, density, conductivity, absorption of electromagnetic radiation, capacitance and inductance of at least one of the aqueous and organic phases to aid in controlling the flow rate of at least one of the aqueous and organic phases.

* * * * *